(12) United States Patent
Shann

(10) Patent No.: US 7,200,843 B2
(45) Date of Patent: Apr. 3, 2007

(54) RETRIEVAL OF SYMBOL ATTRIBUTES

(75) Inventor: Richard Shann, Chepstow (GB)

(73) Assignee: STMicroelectronics Limited, Bristol (GB)

( * ) Notice: Subject to any disclaimer, the term of this patent is extended or adjusted under 35 U.S.C. 154(b) by 440 days.

(21) Appl. No.: 10/032,155

(22) Filed: Dec. 20, 2001

(65) Prior Publication Data

US 2002/0170041 A1 Nov. 14, 2002

(30) Foreign Application Priority Data

Dec. 28, 2000 (GB) ................................. 0031750.3

(51) Int. Cl.
*G06F 9/44* (2006.01)
(52) U.S. Cl. ...................... 717/162; 717/163; 717/164; 717/165; 717/166; 717/167
(58) Field of Classification Search ................ 717/162, 717/163, 164, 165, 166, 167
See application file for complete search history.

(56) References Cited

U.S. PATENT DOCUMENTS

| | | | | |
|---|---|---|---|---|
| 5,193,180 A | * | 3/1993 | Hastings | 717/163 |
| 5,291,601 A | * | 3/1994 | Sands | 719/331 |
| 5,426,747 A | * | 6/1995 | Weinreb et al. | 711/203 |
| 5,469,572 A | * | 11/1995 | Taylor | 717/152 |
| 5,504,901 A | * | 4/1996 | Peterson | 717/162 |
| 5,561,800 A | * | 10/1996 | Sabatella | 719/331 |
| 5,613,120 A | * | 3/1997 | Palay et al. | 717/165 |
| 5,764,987 A | * | 6/1998 | Eidt et al. | 717/100 |
| 5,835,701 A | * | 11/1998 | Hastings | 714/35 |
| 6,206,584 B1 | * | 3/2001 | Hastings | 714/35 |
| 6,219,830 B1 | * | 4/2001 | Eidt et al. | 717/162 |
| 6,578,194 B1 | * | 6/2003 | Baumgart et al. | 717/140 |

FOREIGN PATENT DOCUMENTS

WO WO 94/22078 9/1994

OTHER PUBLICATIONS

N. Ramsey, "Relocating Machine Instructions by Currying", 1996, ACM, p. 226-236.*

* cited by examiner

*Primary Examiner*—Wei Zhen
*Assistant Examiner*—Qamrun Nahar
(74) *Attorney, Agent, or Firm*—Lisa K. Jorgenson; E. Russell Tarleton; Seed IP Law Group PLLC

(57) ABSTRACT

A method of linking a plurality of object code modules to form an executable program, each object code module having section data, a set of relocation instructions and one or more symbols, each symbol having a plurality of attributes associated therewith, wherein the relocation instructions include a data retrieval instruction having a symbol field identifying a symbol and an attribute field identifying a symbol attribute associated with the identified symbol to be retrieved, the method including reading at least one relocation instruction from the set of relocation instructions and where the relocation instruction is a data retrieval instruction, determining the symbol identified by the symbol field and retrieving one of the plurality of symbol attributes associated with the symbol in dependence on the contents of the symbol attributes field of the instruction.

15 Claims, 6 Drawing Sheets

RETRIEVAL OF SYMBOL ATTRIBUTES

BACKGROUND OF THE INVENTION

1. Field of the Invention

This invention relates to forming an executable program using a linker, and in particular to the use of symbol attributes when forming an executable program.

2. Description of the Related Art

Linkers for producing executable programs are known. Generally speaking, a linker acts to link a number of object code modules to form a single executable program. Object code modules are usually generated from program source code modules, these modules being written in a high level language. An assembler/compiler reads each source code module and assembles and/or compiles the high level language of the source code module to produce an object code module. The assembler also generates a number of relocations which are used to combine the object code modules at link time in a linker.

The ELF (executable linking format) standard defines a convention for naming relocation sections belonging to a given section, e.g., rela.abc is relocation section of section .abc. Standard relocations under the ELF format allow an offset in section data to be defined where patching is to occur and a symbol whose value is to be patched. A type field also exists which is used to describe the appropriate method of encoding the value of the symbol into the instruction or data of the section data being patched. According to the existing arrangements, the relocation type definitions are usually created on an ad hoc basis for each instruction set targeted. The 32-bit ELF standard allows only 256 distinct relocation types, so the same types are reascribed to different semantics for each instruction set.

SUMMARY OF THE INVENTION

The disclosed embodiments of the present invention provide a method of linking a plurality of object code modules to form an executable program, each object code module including section data, a set of relocation instructions and one or more symbols, each symbol having a plurality of attributes associated therewith, wherein the relocation instructions include a data retrieval instruction having a symbol field identifying a symbol and an attribute field identifying a symbol attribute associated with the identified symbol to be retrieved, the method including: reading at least one relocation instruction from the set of relocation instructions and where the relocation instruction is a data retrieval instruction, determining the symbol identified by the symbol field and retrieving one of the plurality of symbol attributes associated with the symbol in dependence on the contents of the symbol attributes field of the instruction.

There is also provided a method of linking a plurality of object code modules to form an executable program, each object code module including section data, a set of relocation instructions and one or more symbols, each symbol having a plurality of symbol attributes associated therewith, the symbol attributes including the symbol value, wherein the relocation instructions include a data retrieval instruction having a symbol field identifying one of the symbols and an attribute field identifying one of the plurality of symbol attributes associated with the identified symbol to be retrieved, the method including: reading at least one relocation instruction from the set of relocations; recording a pass value indicative of the number of times the set of relocation instructions have been read; where the relocation instruction is a data retrieval instruction, identifying the symbol identified by the symbol field, determining if the associated symbol value has been retrieved by a further data retrieval instruction during the current or previous repetition of the set of relocation instructions, and responsive to the determination, placing a predetermined value in a store.

There is additionally provided a computer program product for linking a plurality of object code modules to form an executable program, the computer program product including program code having section data, a set of relocation instructions and one or more symbols, each symbol having a plurality of attributes associated therewith, wherein the relocation instructions include a data retrieval instruction having a symbol field identifying a symbol and an attribute field identifying a symbol attribute associated with the identified symbol to be retrieved, the program code arranged so that, when run on a computer, the steps of the method defined herein are performed.

There is further provided a computer program product for linking a plurality of object code modules to form an executable program, the computer program product including program code having section data, a set of relocation instructions and one or more symbols, each symbol having a plurality of symbol attributes associated therewith, the symbol attributes including the symbol value, wherein the relocation instructions include a data retrieval instruction having a symbol field identifying one of the symbols and an attribute field identifying one of the plurality of symbol attributes associated with the identified symbol to be retrieved, the program code arranged so that, when run on a computer, the steps of the method defined herein are performed.

BRIEF DESCRIPTION OF THE SEVERAL VIEWS OF THE DRAWINGS

For a better understanding of the present invention and to show how the same may be carried into effect, reference will now be made by way of example to the accompanying drawings.

DESCRIPTION OF THE PREFERRED EMBODIMENT

Figure 1:
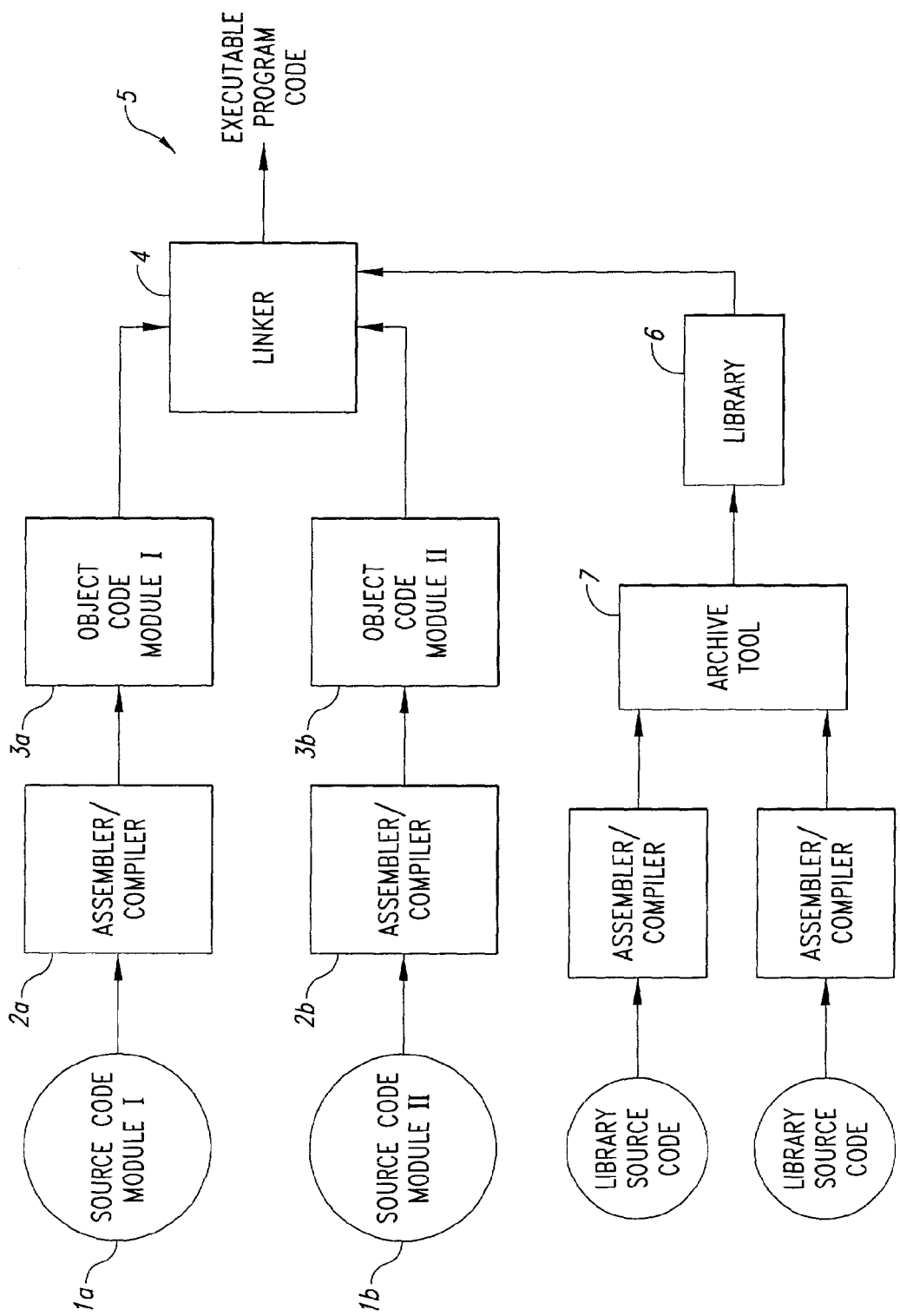
FIG. 1 is a block diagram illustrating the context of the invention.

Referring initially to FIG. 1, a system for linking a number of program modules to form a single executable program is shown schematically. A number of program source code modules 1a, 1b, each module written in a high level language, is provided. The particular high level language used for each source code module may vary from module to module, or alternatively all of the program source code modules may be written in the same high-level language. Each source code module 1a, 1b, is input to a respective assembler/compiler 2a, 2b which assembles and/or compiles the high level language of the source code module to produce an object code module 3a, 3b. Each object code module 3a, 3b is the low level language equivalent to each respective source code module 1a, 1b, the low level language being a language which is directly executable by a target microprocessor into which the final resulting single executable program is to be loaded. It will be appreciated that a single assembler/compiler could be used to sequentially convert a number of source code modules to respective object code modules.

Each object code module 3a, 3b is passed to a linker 4. Object code modules may be stored in libraries, such as the library 6 in FIG. 1, placed under the control of an archive tool 7. The linker combines all of the respective object code modules 3a, 3b to produced single executable programs, still in the low level language suitable for the target processor into which the program is to be loaded.

For a given architecture there are often different instruction sequences for achieving the same objective depending on the values of the operands that are being handled. For example, "load a function address into a register" may be achieved in various ways depending on the address in question. When the operand is unknown before link time there is scope for re-writing the code at link time depending on the value of the operand. This re-writing of the code is a form of optimization termed herein "linker relaxation." In United Kingdom Patent Application No 9920905.8 in the name of the present applicant, a scheme is described for an achieving linker relaxation based on information written in assembler files and passed to the linker as special relocations, which is incorporated herein by reference in its entirety. The special relocations are also used for rewriting particular instruction sequences as one of a set of known alternatives.

Each assembler generates an object code module that includes sets of section data, each set of section data having a set of relocations generated by the assembler to describe how the section data is to be patched so as to render it compatible with other section data to form the program 5. These relocations are generated by the assembler. The section data includes a plurality of code sequences executable in the final program and data values to be accessed by the executing program.

In particular a set of "relocations" to enable link time optimization of code is described. Conventionally a relocation describes the patching of section data or instructions with (encoded versions of) symbols. Such relocations are referred to herein as "bit relocations." In addition a number of so-called "special relocations" are discussed in GB 9920905.8 which are sometimes referred to in the following as "non-bit" relocations to distinguish from conventional "bit" relocations.

In particular, in GB 9920905.8 a "macro-call" relocation is defined that allows section data (code sequences) to be inserted from a special section (".macro" section) written to contain frequently used idioms. Section data that is to be selectively inserted into a section being optimized by the linker can be thought of as a "link time macro." It is parameterized by symbols with the substitution of the values for the parameters being performed by the linker.

One use of the macro-call relocation is to conditionally introduce selected instruction sequences from a number of alternatives into the executable program. The alternative instruction sequences are written as alternative sequences in the special macro section in the object code modules and a macro call is inserted at the point in the ordinary section wherein one or more of them may be needed. As mentioned above, the object code modules can be user defined or retrieved by the linker 4 from a library 6 as object files containing template code for insertion in the executable program wherever it is needed.

For the sake of completeness there follows the bit relocations and non-bit relocations, which are discussed in the earlier application previously referred to and which have application in embodiments of the present invention.

It is assumed that a skilled reader is familiar with the ELF format and so only a very brief description will be given here prior to describing the special relocations.

The ELF (executable and linking format) standard defines a convention for naming relocation sections belonging to a given section. For a section of name .xxx the standard prescribes relocation sections .rel.xxx and .rela.xxx. The structure of these sections is defined and a partial semantic associated with them. Specifically an entry in .rel.xxx has, an offset field—the offset in the xxx section where the patching is to occur, a symbol field—the symbol whose value is to be patched, and a type field—an otherwise undefined type.

It is the type field that is used to describe the appropriate method of encoding the symbol value into the instruction or data of the .xxx section.

The .rela.xxx section is similarly defined but has an extra field (the addend) with the semantic that the addend is to be added to the symbol value before patching in.

In order to support the special relocations described herein, a new type of relocation section is defined, with the naming convention .relo.xxx which is specifically intended to support optimizing at link time. In this way the .rel and .rela sections are left free to be used for conventional bit relocations.

Figure 2:
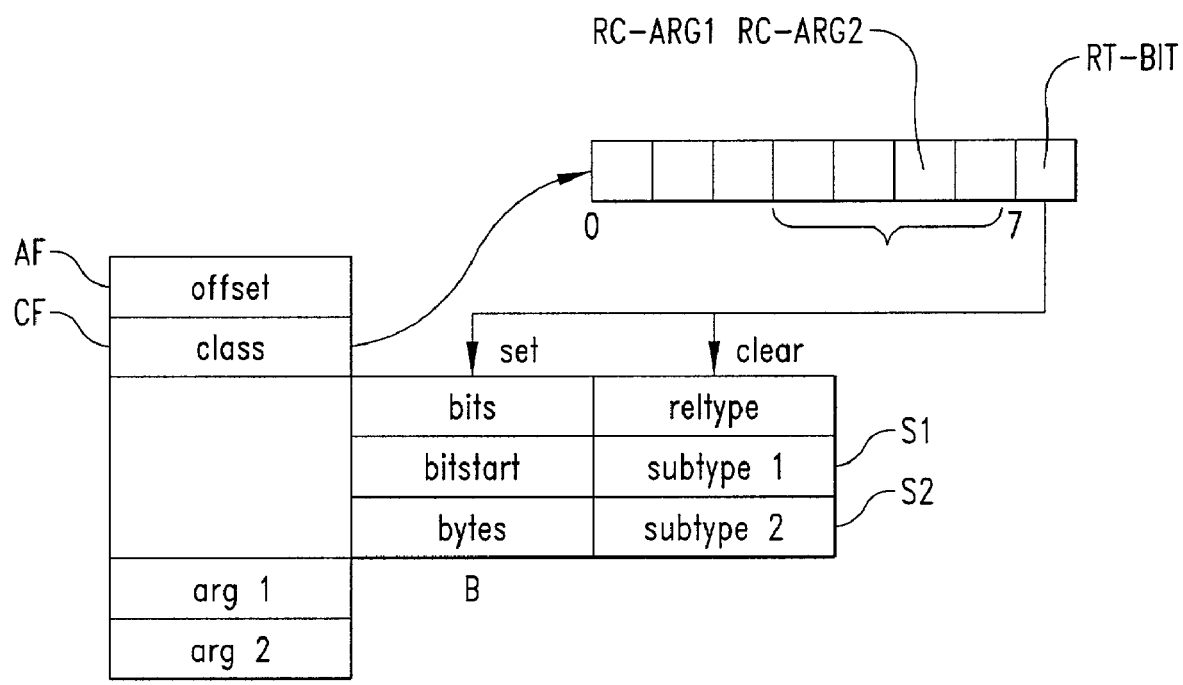
FIG. 2 is a sketch showing the layout of bit and non-bit relocations.

The format of an entry in the .relo section is given in Annex 1 (it should be read in the context of the 32-bit ELF standard). It is illustrated in FIG. 2.

The underlying structure of the new type has an address field AF (r_offset), a 1 byte classification field CF (r_class), 3 information fields which are labeled reltype, S1, S2 (1 byte each) for non-bit NB relocations and bit, bitstart, bytes for bit (B) relocations, and two one word arguments (r_arg1; r_arg2).

r offset

The location at which to apply the relocation action. (That is, if this is the .relo.xxx section, then r_offset is the offset in the .xxx section where the relocation applies.)

r class

The classification byte indicates the type of relocation (bit or non-bit), and also conveys information about the use of the remaining fields.

In the classification byte, bit 7 RT_BIT indicates a bit relocation if set (in which case the B fields apply) or non-bit relocation if clear (in which case the NB fields apply). Bits 3–6 specify whether the r_arg1,2 fields are a symbol index or a value. Table 1 defines how the bits specify the interpretation of the r_arg1,2 fields.

r_arg1,2

The interpretation of these fields depend on bits 3–6 of the r_class field. Two bits RC_ARG1, RC_ARG2 are associated with each of r_arg1 and r_arg2. For bit relocations these two fields are normally used as symbol and addend.

For non-bit relocations the fields r_arg1,2 hold constant data being passed with a non-bit relocation. As with bit relocations bits 6 and 5 say whether they hold a symbol index or a value. The actual use of any symbol or value passed with a non-bit relocation depends on the nonbit.reltype field. This may be an absolute value representing things such as alignment, register numbers etc. The semantics are given in the table of relocation types in Annex 2.

The bit (B) type fields:

r.bit.bits

The number of bits that are to be patched. A lower case "b" is used to indicate this quantity in the name of a relocation.

r.bit.bitstart

The least significant bit to be patched. A lower case "s" is used to indicate this quantity in the name of a relocation.

r.bit.bytes

The size of the object being patched. This is needed for big endian targets in order to find which byte the least significant bit is to be found in, and where the higher order bits are. An upper case "B" is used to indicate this quantity in the name of a relocation.

Note that the following notation is used to name the bit relocations:

R_b<val>s<val>B<val> where <oval>'s represent the number of bits, start bit and number of bytes as specified by the r-bits, r.bitstart, r.bytes fields. For example R_b16s0B4 will patch the least significant two bytes of a four-byte object. This will be the bytes at offsets 0,1 or 4,3 depending on the target endianness.

The non-bit (NB) type fields:

r.nonbit.reltype

This field describes what sort of action the linker must perform. These include such things as executing an operation on the linker's internal stack of values, storing parameters to macros, conditionally deleting section data etc, as described in more detail later.

r.nonbit.subtype1,2 (S1,S2)

These fields hold values whose interpretation depends on the reltype field, and bits 3 to 6 of the classification field.

TABLE 1

| Name | RC_ARG1 | Meaning |
| --- | --- | --- |
| RC_PARAM | 3 | r_arg1 is param |
| RC_VAL | 2 | r_arg1 is value |
| RC_SYM | 1 | r_arg1 is symbol |
| RC_UNUSED | 0 | r_arg1 is unused |

Figure 3:
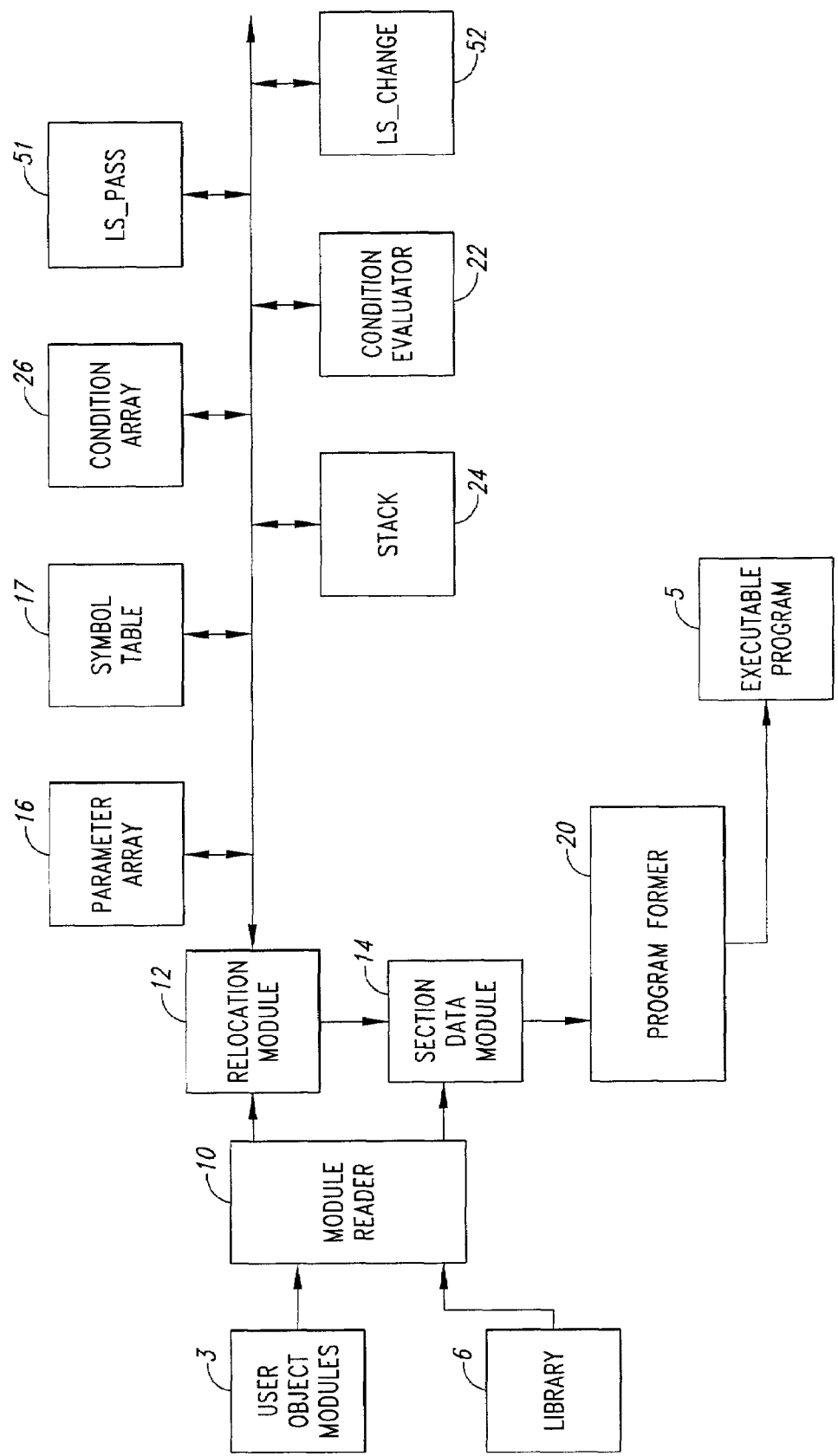
FIG. 3 is a block diagram of a linker for use with embodiments of the present invention.

The new type of relocation section described in GB 9920905.8 supports a number of special relocations that allow a number of different functions to be performed by the linker. FIG. 3 is a block diagram of components of the linker which will be used to describe these additional functions. It will be appreciated that in practice the linker can be constituted by a suitably programmed microprocessor. It will be understood therefore that the schematic blocks shown in FIG. 3 are for the purposes of explaining the functionality of the linker.

The linker comprises a module reader 10 which reads a set of incoming object files as user written code modules and library object files from the library 6. A relocation module 12 reads the relocations in the object code module. A section data module 14 holds section data from the object code module and allows patching to take place in response to relocation instructions in the object code module interpreted by the relocation module 12. The relocation module can also interpret special relocations and apply these to the section data held in the section data module 14. A program former 20 receives sequences from the section data module 14 and/or the library 6 depending on the actions taken by the relocation module 12 and forms the executable program 5 which is output from the linker 4. The linker also includes a condition evaluator 22 that operates in conjunction with a stack-type store 24. The condition evaluator reads the value of the top entry of the stack 24.

The linker also implements three arrays or tables as follows, a parameter array 16, a symbol table 17, and a condition array 26.

A number of the non-bit relocations allow code sequences to be conditionally included in a final executable program where all the possible alternative sequences are included in the section data of the object code module that the linker is currently examining. The code sequences that are not required are deleted at link time. The following are the non-bit relocations used to support conditional section data deletions, which are issued by the assembler responsive to special conditional Assembler Directives.

R IF

Causes the top entry to be popped from the linker's stack of values. When the value is zero, then section data is skipped and the succeeding relocations are ignored until R_ELSE/R_ENDIF is encountered. When the value is non-zero, then relocations are processed and instructions are not deleted until R_ELSE/R_ENDIF is encountered.

R ENDIF

Defines the end of the relocations subject to the R_IF relocations and of section data to be conditionally deleted subject to the R_IF relocation.

R ELSE

If this is encountered while section data is being taken, then section data is skipped and the succeeding relocations are ignored until R_EN_DIF is encountered. If encountered while skipped due to R_IF, then relocations are processed and instructions are no longer deleted until R_EN_DIF is encountered.

R STORE index

A value is popped from the linker's stack of values. It is put in a conditional array in the linker kept by the linker for this purpose. The value is stored at the index passed with the relocation. This relocation avoids the overhead of passing the same calculation to the linker many times over.

R FETCH index

A value is pushed on the linker's stack of values. The value pushed is the value in the condition array 26 at the index passed with the relocation.

A further set of non-bit relocations is defined for implementing macros.

R START MACRO

The linker seeks this relocation at the offset labeled by the macro name (relocations prior to this one are not processed). It is an error if the linker encounters this instruction except on entry to a macro.

R GET PARAM index

The relocation conveys an index for accessing a parameter array in the linker. The linker reads the index'th parameter from the parameter array. If the parameter is an index in the symbol table 17 of the linker, the symbol's value is pushed on to the linker's stack of values. Otherwise the value itself is pushed.

R EXIT MACRO

The linker stops inserting bytes/processing relocations from the .macro section. It discards the parameter array and then the macro invocation terminates.

Further non-bit relocations for Ordinary Sections include:

R PUT PARAM index

An index is passed to the linker and the value is stored by the linker in the parameter array at this index. The linker also stores the value of this relocation along with the parameter. This enables the linker to perform type checking when R_GET_PARAM is encountered.

R MACRO CALL symbol

The symbol specifies an offset in the macro section. The relocations in.relo.macro are traversed from the R START MACRO at the offset until R EXIT MACRO is processed. Section data from the macro section are inserted in the section at the location of the R MACRO CALL relocation.

In embodiments of the present invention described hereinafter a further special relocation type is described that allows arbitrary calculations to be passed to the linker by way of a number of special relocations that are defined by the reltype field of the new relocation format ELF32_relo and also allows various parameters to be pushed onto the linker stack.

To place the value of a constant onto the stack the following relocation may be used:

R-PUSH value

Equally the value of a symbol held in the symbol table 17 may be placed onto the stack by the use of the relocation:

R-PUSH symbol

Figure 4:
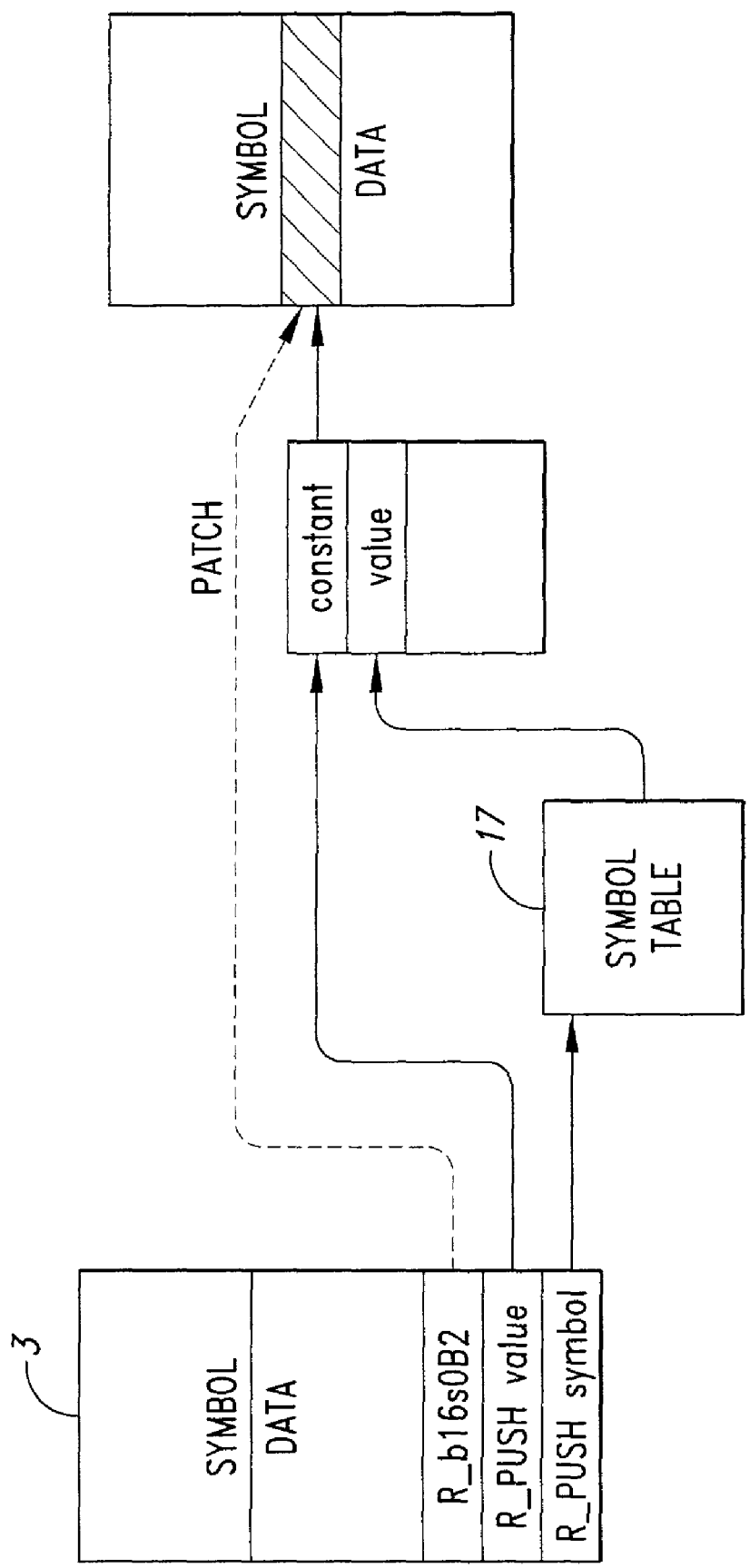
FIG. 4 is a schematic diagram illustrating one example of the use of relocations to retrieve symbol attributes.

The above relocations are implemented as described in the following with reference to FIGS. 3 and 4. The relocation module considers the first relocation read by the module reader 10, in this case R-PUSH symbol and reads the required value of the identified symbol from the symbol table 17 and pushes the value onto the top of the stack. The next bit relocation R-b16s0B2 patches the symbol value from the top of the stack into the 16-bit target integer.

The set of the special relocation types listed in Annex 2 allow the linker to support a general-purpose stack based calculator. These relocations allow the value of symbols and constants to be pushed on the stack 24 and a designated manipulation to be performed. With the bits RC_ARG1 in the class field CF set to RC_UNUSED (see Table 1), binary operators act on the top two stack entries. Otherwise, the value passed and the top of stack (tos) entry are used. Unary operators operate on the top of the stack 24 (tos). Both pop their operands and place the result on the top of the stack. The full definition of the relocation types to support this is given in Annex 2.

The following description describes a further novel Relocation Instruction, R_ATTRIB which allows other symbol attributes to be pushed onto the stack. The format of this further relocation is as follows:

R_ATTRIB symbol_attribute

This relocation pushes a specified attribute of the specified symbol onto the stack of the Linker. Each symbol in the symbol table may have a number of attributes associated with it which are held in separate symbol fields of the symbol definition in the symbol table. These associated attributes include:

i) The value of the symbol. To push the value of a symbol onto the stack the R_ATTRIB relocation is expressed as R_ATTRIB symbol_value. This achieves the same results as the R_PUSH value relocation.

ii) The symbol itself. To push a symbol itself as a pointer to the symbol in the symbol table, the R_ATTRIB relocation is expressed as R_ATTRIB symbol_self.

iii) The Binding of the symbol. This is held in a field BIND of the attribute relocation R_ATTRIB symbol_bind. Multiple definitions of a symbol may be generated, only one of which is selected at link time. The binding of a symbol may be either WEAK or STRONG and it is the symbol binding that allows one definition to be selected in preference to the other. The binding of a symbol may be generated by each assembler/compiler when each source code module is assembled/compiled. When multiple definitions are generated they may be given the WEAK binding attribute, indicating to the linker that if no STRONG definition is found any one of the WEAK symbol definitions may be chosen and all further references to that symbol point to the selected one. This particular use of the symbol binding may be referred to as a ranking determinator, although the binding field is also used for other purposes as well. The binding of the selected symbol is changed to the STRONG binding.

It will be appreciated by those skilled in the art that the binding attribute itself is already known and therefore requires no additional functionality to the linker described in FIG. 3. It will also be appreciated that the further bindings LOCAL and GLOBAL also exist, allowing the following binding combinations to be given to symbol definitions;

i. WEAK/GLOBAL
ii. WEAK/LOCAL
iii. STRONG/GLOBAL
iv. STRONG/LOCAL

The LOCAL/GLOBAL binding is used to indicate whether the symbol 'fred', for example, in object module 1 is the same symbol as the symbol 'fred' in object module 2—to be considered the same they must both be GLOBAL.

The selection of the symbol definition in accordance with its binding is a further function provided by embodiments of the present invention and is performed by the linker. All the symbol definitions from the object code module are examined and where multiple definitions occur for the same symbol the following conditions are applied:

i. If more than definition has a STRONG binding a fatal error is deemed to have occurred and the link process is halted.

ii. If all the definitions have a WEAK binding any one is selected on a substantially arbitrary basis, and its binding changed to STRONG.

iii. If only one definition has a STRONG binding it is the definition that is selected.

The relocation R_ATTRIB symbol_bind pushes the binding of the symbol onto the stack.

iv. The REFERENCED symbol attribute. The corresponding R_ATTRIB relocation has the format R_ATTRIB symbol_referenced and causes the linker to push a 1 onto the stack if the symbol referred to has been previously referred to in an R_ATTRIB symbol_value instruction during either the current or previous pass of the linker. Otherwise a 0 is pushed onto the stack. How this is achieved is explained below.

As is known in the art, the linker may execute the linking and relocation process on the object code modules a number of times before the output target executable is in the optimum form. In embodiments of the prevent invention, the state of certain variables may be recorded during each linker pass.

Two such variables are LS-PASS and LS-CHANGE. LS-PASS is the number of times all of the relocation instructions in the object code modules have been executed, i.e., the number of passes the linker has made. It is incremented by 1 by the linker at each pass. LS-CHANGE is a flag and is set FALSE by the linker at the start of each pass and becomes TRUE if a symbol that refers to a set of section data changes its value. This indicates that the target executable program has changed. The variables LS PASS and LS CHANGE are updated by the linker 4 and are stored in the variable modules LS PASS 51 and LS CHANGE 52, shown in FIG. 3. These variables can be used as stack values by other relocations instructions to allow state variable based conditions to be determined.

Figure 5:
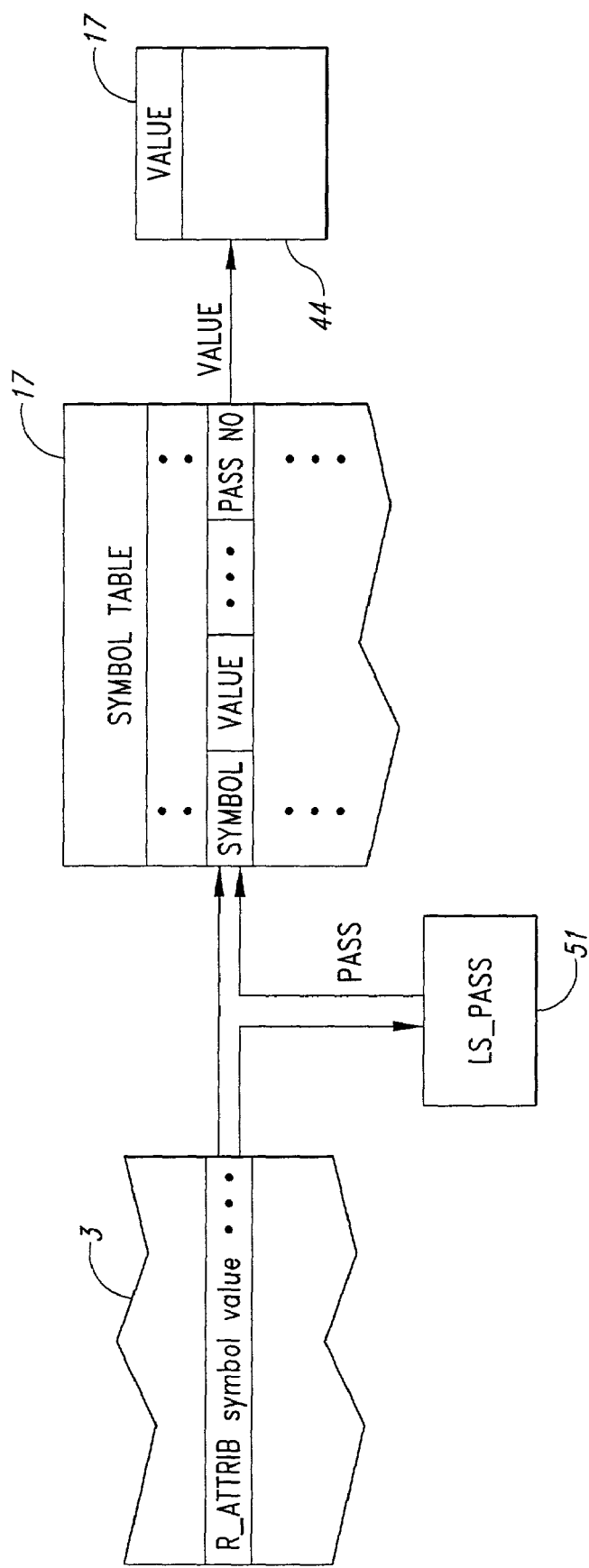
FIG. 5 is a schematic diagram illustrating one example of storing a variable value when a symbol attribute is retrieved.

A further function of an R_ATTRIB symbol_value relocation is to store the current value of the state variable LS_PASS in a further symbol field in the symbol table whenever the R_ATTRIB relocation is executed, as is shown schematically in FIG. 5. The value of variable LS-PASS is fetched from the LS-PASS variable store 51 and placed in the pass number symbol field in the symbol table whenever an R-ATTRIB symbol_value instruction is executed. It is to be noted that in embodiments of the present invention the further symbol field SF-PASS is generated by the Linker in the symbol table 17 and that no additional information is stored in the object modules over standard ELF modules of the prior art.

Figure 6:
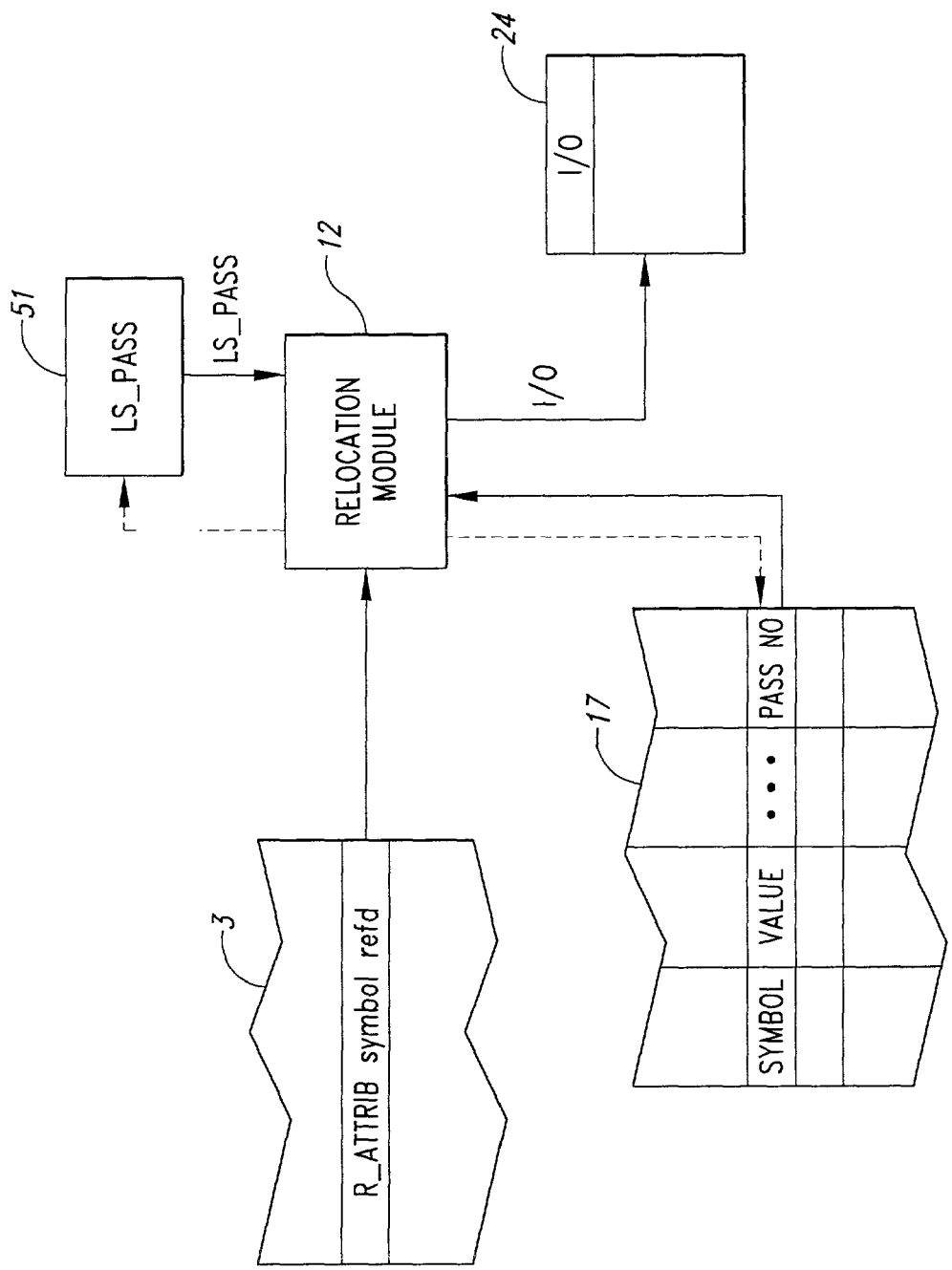
FIG. 6 is a schematic diagram illustrating an example of examining a symbol attribute and placing a value on a store in dependence of the outcome of the examination.

With reference to the REFERENCED symbol attribute, when, an R_ATTRIB symbol_referenced instruction is subsequently executed the value of LS_PASS stored in the symbol field SF_PASS is retrieved, together with the current value of the state variable LS_PASS from the state variable module LS_PASS 51. This is shown schematically in FIG. 6. The relocation module 12 determines if the value of the symbol field SF_PASS is equal to or only one less than the value of the state variable LS_PASS and if so pushes a 1 onto the stack. Otherwise a zero is pushed onto the stack.

The inclusion of a symbol field which holds information relating to the number of passes executed by the Linker when the symbol's value was last read via the R_ATTRIB_ symbol value relocation provides further advantages. In addition to allowing selected attributes to be pushed onto to the stack, the R_ATTRIB instruction and associated symbol fields allow section data labeled by unreferenced symbols to be eliminated at link time.

If it transpires that during linking a symbol is not accessed by a R_ATTRIB symbol value instruction, the value of the SF_PASS symbol field will remain at zero. Because of this such symbols will evaluate R_ATTRIB_symbol referenced as zero in subsequent passes. Consequently the user can instruct the linker to remove the section data that the symbol labels by using a conditional R_IF instruction as follows:

If it transpires that during linking a symbol is not accessed by a R_ATTRIB symbol value instruction, the value of the SF_PASS symbol field will remain at zero. Because of this such symbols will evaluate R_ATTRIB_symbol referenced as zero in subsequent passes. Consequently the user can instruct the linker to remove the section data that the symbol labels by using a conditional R_IF instruction as follows:

---

R_ATTRIB_-symbol=reference fred
R_INV
R_IF
.
.
{the section data labelled by fred}
.
.
R_END IF

---

If 'fred' is not referenced, the section data will not be included in the final program. (R_INV reverses 10 on the top of the stack.)

As mentioned above in connection with the symbol field BIND, multiple definitions of a symbol may be generated, only one of which is selected at link time. The remaining definitions are called Orphans and should ideally be deleted. However, even if the user instructs the linker to remove the duplicate definitions by writing R_ATTRIB_symbol_referenced and R_INV,R_IF as described above, the definitions will not be removed because the R_ATTRIB_symbol_referenced will have become a reference to the nominated symbol definition, not the duplicate definitions. To avoid this, when the Linker resolves the symbol references prior to actually linking the individual object code modules the symbols referenced in R_ATTRIB_symbol_refd instructions are treated specially: the original binding of a symbol is compared by the Linker with the binding of any selected symbol which is pointed to. If the binding differs, the R_ATTRIB symbol refd instruction referring to the orphan symbol is replaced by an instruction which pushes a 0 onto the stack, so that the definition associated with an orphan symbol may be deleted as described above.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

---

Annex 1

```
typedef struct {
    Elf32__Addr r__offset;
    unsigned char r__class;
    union {
        struct {
            unsigned char bits;
            unsigned char bitstart;
            unsigned char bytes;
        } bit;
        struct {
            unsigned char reltype;
            unsigned char subtype1;
            unsigned char subtype 2;
        } nonbit;
    } r;
    Elf32__Word r__arg1;
    ELF32__Word r__arg2;
} Elf32__Relo;
```

Annex 2

| Relocation Type Name | reltyp | Meaning (C syntax is assumed) |
|---|---|---|
| R_NONE | 1 | No action is performed. |
| R_NOOPTIMISE | 2 | Optimization will be turned off from r_offset |
| R_OPTIMISE | 3 | Optimization will be turned on from r_offset |
| R_PROC | 4 | Marks start of PROC. One marker byte is inserted at r_offset |
| R_ENDPROC | 5 | Marks end of PROC |
| R_MAX (signed) | 6 | tos=(arg1>arg2?arg1:arg2) |
| R_OR | 7 | tos=(arg1\|arg2) |
| R_XOR | 8 | tos=(arg1^arg2) |
| R_AND | 9 | tos=(arg1&arg2) |
| R_EQ | 10 | tos=(arg1==arg2) |
| R_NE | 11 | tos=(arg1!=arg2) |
| R_GT | 12 | tos=(arg1>arg2) |
| R_GE | 13 | tos=(arg1>=arg2) |
| R_LT | 14 | tos=(arg1<arg2) |
| R_LE | 15 | tos=(arg1<=arg2) |
| R_SHR | 16 | tos=(arg1>>arg2) note: arithmetic shift |
| R_SHL | 17 | tos=(arg1<<arg2) |
| R_ADD | 18 | tos=(arg1+arg2) |
| R_SUB | 19 | tos=(arg1-arg2) |
| R_MUL | 20 | tos=(arg1*arg2) |
| R_DIV | 21 | tos=(arg2/arg2) note: undefined if arg2==0 |
| R_REM | 22 | tos=(arg1%arg2) note: undefined if arg2==0 |
| R_PC | 23 | tos<-P |
| R_NEG | 24 | toss=-tos |
| R_INV | 25 | toss=~tos |
| R_REL | 26 | tos<-O |
| R_SIZE | 27 | tos<Sz section size |
| R_PUSH | 28 | tos<-symbol attribute or value. s1 holds flag saying which symbol attribute value to be pushed. |
| R_DUP | 29 | tos<-tos (duplicates the top of stack) |
| R_IF | 30 | if (!tos) section data is skipped |
| R_IF_FIXED | 31 | Worst case branch (only for .macro). |
| R_ELSE | 32 | see R_IF (not supported in .macro). |
| R_ENDIF | 33 | see R_IF |
| R_START_MACRO | 34 | Informational, for error checking. |
| R_EXIT_MACRO | 35 | Linker stops inserting section data at r_offset |
| R_PUT_PARAM | 36 | s1 holds index, s2 holds type information; the linker associates r_arg with these |
| R_GET_PARAM | 37 | s1 holds index, s2 holds type information; the linker retrieves the value associated with these |
| R_STORE | 38 | s1 holds index; the linker associates the value r_arg with the index for retrieval via R_FETCH |
| R_FETCH | 39 | s1 holds index; the linker retrieves the value associated with the index |
| R_MACRO_ALL | 40 | r_arg is a symbol in .macro section whence to insert section data. One marker byte is present at r_offset |

Key
s1,s2 Mean the r.nonbit .subtype1,2 field of the relocation.
S Means the sum of r_arg1 and r_arg2 after interpreting them as symbol values or constant values according to RC_ARG1/2.
So The value of symbol's st_other field.
O Means the offset, relative to the base of the containing section, of the relocation entry symbol.
P The absolute address of the relocation entry, r_offset (i.e., the PC).
Sz Means the size of the relocation entry symbol's defining section.
tos Top-of-stack, the value at the top of the internal linker stack.
tos <- Pushes a 32-bit signed value onto the internal linker stack
tos=arg1 op arg2 If both RC_ARG1 and RC_ARG2 are RC_UNUSED then both the arguments are assumed to be on the stack (with arg1 pushed first). Otherwise arg1 is S (i.e., the symbol value + addend) and arg2 is tos. The argument(s) on the stack are popped and the operation indicated as op is performed. Finally the result is pushed on the stack.

What is claimed is:

1. A method of linking a plurality of object code modules to form an executable program, each object code module having section data, a set of relocation instructions, and one or more symbols, each symbol having a plurality of symbol attributes associated therewith, wherein said relocation instructions include a data retrieval instruction having a symbol field identifying a symbol to be retrieved and an attribute field identifying a symbol attribute associated with said identified symbol to be retrieved, the method comprising linking the plurality of object code modules including the steps of:

in the linking process, reading at least one relocation instruction from said set of relocation instructions and where said relocation instruction is a data retrieval instruction, determining the symbol identified by the symbol field and retrieving one of said plurality of symbol attributes associated with said symbol in dependence on contents of the symbol attribute field of said instruction;

recording a pass value indicative of a number of times said set of relocation instructions from said plurality of object code modules have been read; wherein said plurality of symbol attributes includes said pass value indicative of a most recent repetition of reading said set of relocation instructions during which a value of said symbol has been retrieved; and wherein determining if the pass value indicative of the most recent repetition is equal to or only one less than said recorded pass value and in response to said determination placing a predetermined value in a store.

2. The method of claim 1 wherein said retrieved symbol attribute is placed in a store for subsequent use by a further relocation instruction.

3. The method of claim 2 wherein said store is a stack.

4. The method of claim 1 wherein said plurality of symbol attributes includes the value of the symbol.

5. The method of claim 1 wherein said plurality of symbol attributes includes the name of the symbol itself.

6. The method of claim 1 wherein said plurality of symbol attributes includes a ranking determinator, said ranking determinator defining which one of a plurality of definitions of said symbol is selected when forming said executable program.

7. The method of claim 1, further comprising reading said predetermined value placed in said store and deleting the section data labeled by said symbol in response to the value of said predetermined value.

8. A method of linking a plurality of object code modules to form an executable program, each object code module comprising section data, a set of relocation instructions, and one or more symbols, each symbol having a plurality of symbol attributes associated therewith, said symbol attributes including a symbol value, wherein said relocation instructions include a data retrieval instruction having a symbol field identifying one of said symbols to be retrieved and an attribute field identifying one of said plurality of symbol attributes associated with said identified symbol to be retrieved, the method comprising: linking the plurality of object code modules including, in the linking process, the steps of:

reading at least one relocation instruction from said set of relocation instructions;

recording a pass value indicative of a number of times said set of relocation instructions have been read;

where said relocation instruction is a data retrieval instruction, identifying the symbol identified by said symbol field, determining if said associated symbol value has been retrieved by a further data retrieval instruction during current or previous repetition of reading said set of relocation instructions, and responsive to said determination placing a predetermined value in a store.

9. The method of claim 8, further comprising:
when said symbol attribute field of said data retrieval instruction identifies said symbol value, storing said pass value in a further one of said symbol attributes.

10. A computer program product implemented in a computer-readable medium for linking a plurality of object code modules to form and executable program, said computer program product comprising: program code means having section data, a set of relocation instructions, and one or more symbols, each symbol having a plurality of symbol attributes associated therewith, wherein said relocation instructions include a data retrieval instruction having a symbol field identifying a symbol to be retrieved and an attribute field identifying a symbol attribute associated with said identified symbol to be retrieved, said program code means arranged so that, when run on a computer, and during the linking process, at least one relocation instruction is read from the relocation instructions, and where the relocation instruction is a data retrieval instruction, the symbol identified by the symbol field is determined and one of the plurality of symbol attributes associated with the symbol in dependence on contents of the symbol attribute field of the instruction is retrieved and placed in a stack for subsequent use by a further relocation instruction, and a pass value indicative of a number of times the relocation instructions from the plurality of object code modules have been read is recorded; and wherein the plurality of symbol attributes includes the pass value indicative of a most recent repetition of reading the set of relocation instructions during which a value of the symbol has been retrieved, and further including a determination of whether the pass value is equal to or only one less than the recorded pass value, and in response to the determination placing a predetermined value in a store.

11. The computer program product of claim 10, wherein the plurality of symbol attributes include a ranking determinator, the ranking determinator defining which one of a plurality of definitions of the symbols is selected when forming an executable program.

12. The computer program product of claim 11, further comprising reading the predetermined value placed in the store, and deleting the section data labeled by the symbol in response to the value of the predetermined value.

13. A computer program product implemented on a computer system for linking a plurality of object code modules to form an executable program, said computer program product comprising program code means having section data, a set of relocation instructions and one or more symbols, each symbol having a plurality of symbol attributes associated therewith, said symbol attributes including a symbol value, wherein said relocation instructions includes a data retrieval instruction having a symbol field identifying one of said symbols to be retrieved and an attribute field identifying one of said plurality of symbol attributes associated with said identified symbol to be retrieved, said program code means arranged so that, when run on a computer, and during the linking process, the program code means reads at least one relocation instruction from the set of relocation instructions, records a pass value indicative of a number of times the set of relocation instructions have been read, and with the relocation instruction as a data retrieval instruction, the program code means identifies the symbol identified by the symbol field, determines if the associated symbol value has been retrieved by a further data retrieval instruction during a current or previous repetition of reading the set of relocation instructions, and places a predetermined value in a store in response to the determination.

14. The computer program product of claim 13, wherein when the symbol attribute field of the data retrieval instruction identifies the symbol value, the program code means stores the pass value in a further one of the symbol attributes.

15. The computer program product of claim 14, wherein the plurality of symbol attributes includes a ranking determinator that determines which one of a plurality of definitions of the symbols is selected when forming an executable program.

\* \* \* \* \*